Nov. 5, 1946.　　　　C. J. ECKERT　　　　2,410,722
FILM VIEWING DEVICE
Filed Jan. 31, 1944　　　　3 Sheets-Sheet 1
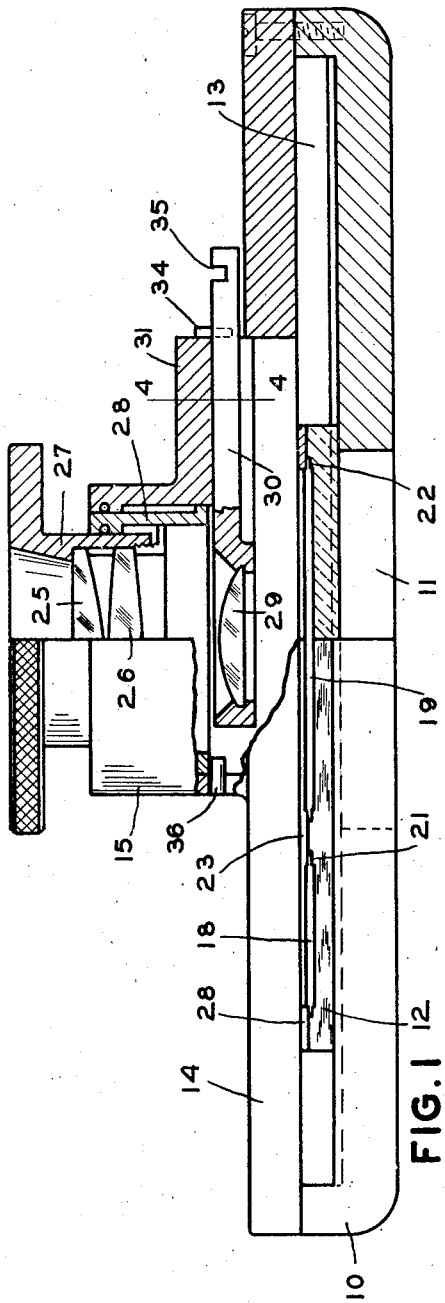
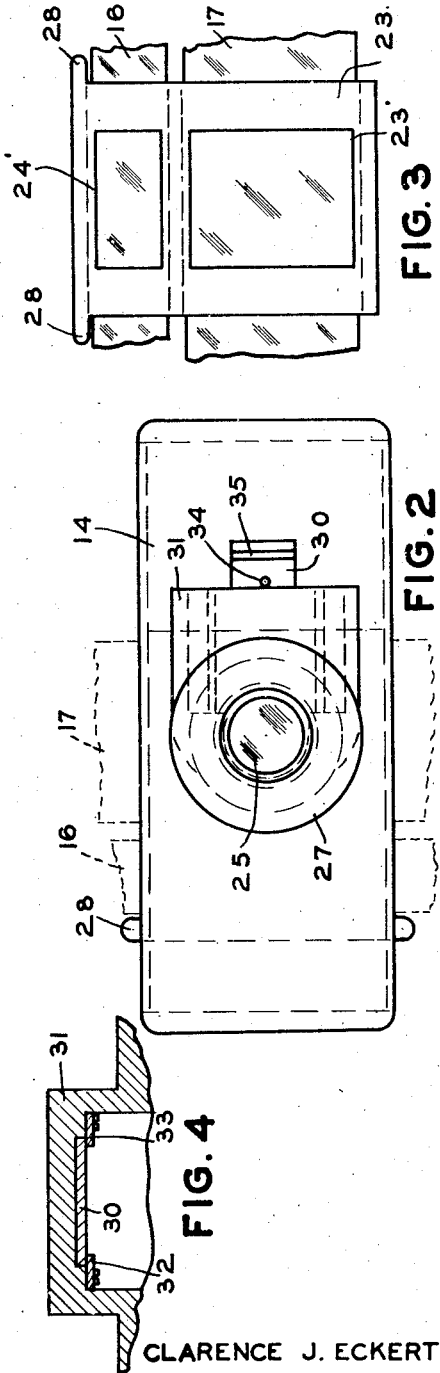
CLARENCE J. ECKERT
INVENTOR
BY
ATTORNEYS Nov. 5, 1946.  C. J. ECKERT  2,410,722
FILM VIEWING DEVICE
Filed Jan. 31, 1944  3 Sheets-Sheet 2
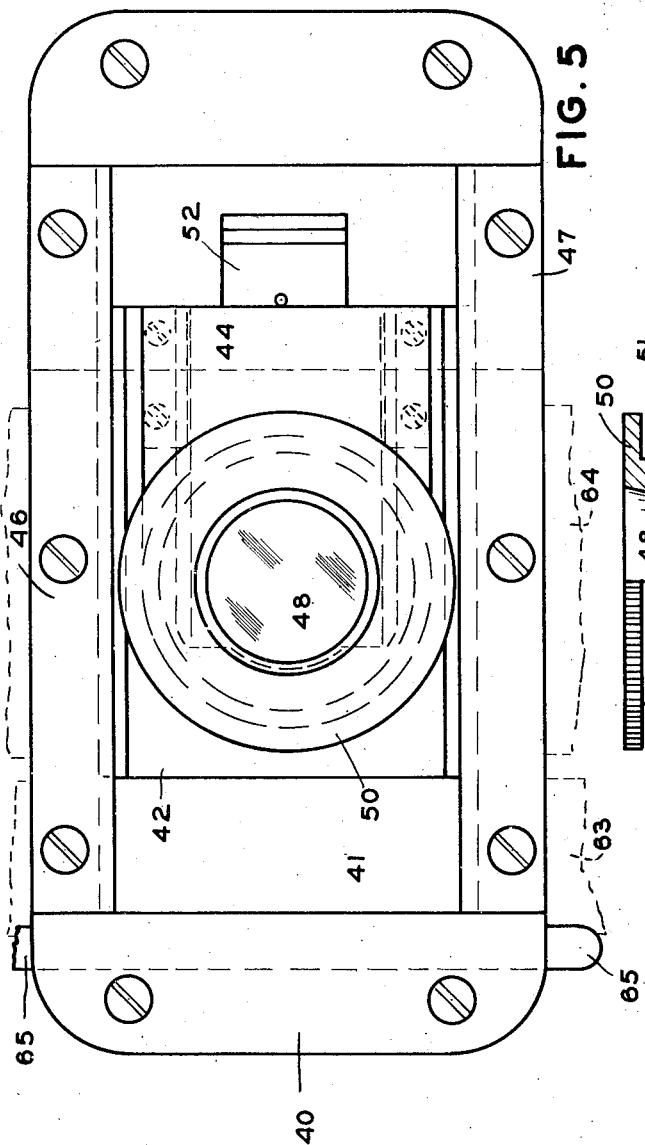
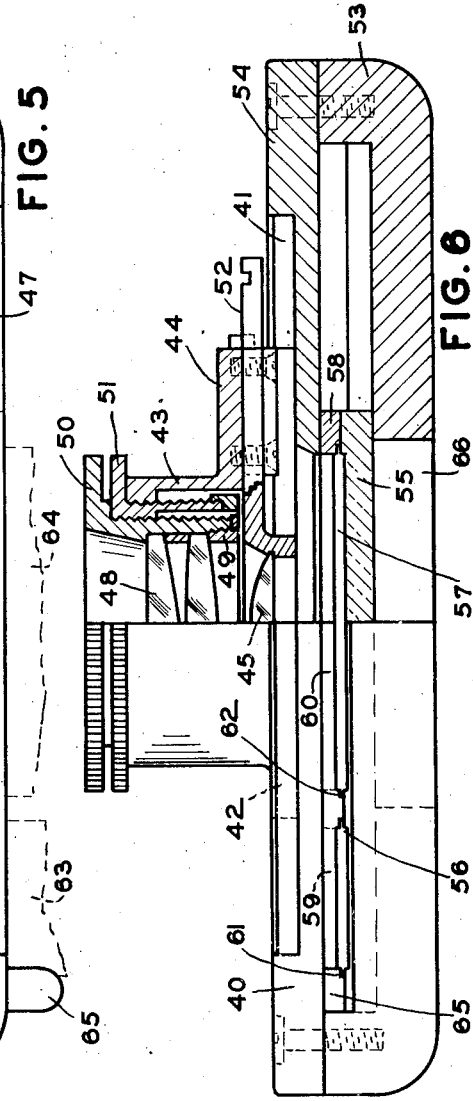
CLARENCE J. ECKERT
INVENTOR
BY
ATTORNEYS Nov. 5, 1946.    C. J. ECKERT    2,410,722
FILM VIEWING DEVICE
Filed Jan. 31, 1944    3 Sheets-Sheet 3

CLARENCE J. ECKERT
INVENTOR
BY
ATTORNEY

Patented Nov. 5, 1946

2,410,722

UNITED STATES PATENT OFFICE 2,410,722

FILM VIEWING DEVICE

Clarence J. Eckert, Rochester, N. Y., assignor to Bausch & Lomb Optical Company, Rochester, N. Y., a corporation of New York Application January 31, 1944, Serial No. 520,457

8 Claims. (Cl. 88—39)

This invention relates to a film viewing device and more particularly to apparatus for viewing films of different widths at varying magnifications.

Continuous films are now widely used for microfilming records, papers, and the like, for securing miniature reproductions of the same without the necessity of referring to the original documents and also to realize the many advantages accruing from condensing the information contained therein in a small space for storage and transportation purposes. These films usually come in two different widths and it is, therefore, desirable to employ a viewing device having structure for permitting either of the films to be viewed at the option of the user.

The viewing device of the present invention will accommodate the two film sizes generally used and yet is sufficiently compact to permit a user to easily handle the same. The device is primarily intended to be used by a worker in the field and can be readily carried on the person of the user.

It is the principal object of the present invention to provide a compact film viewing device for observing selected portions of one of two films of different widths at varying magnifications. For this purpose, in the preferred embodiment of the invention, the device comprises a casing having a chamber extending longitudinally thereof and in which is movably mounted a transparent film holder having spaced slots of different widths for receiving films of different widths. The casing is so formed that the film holder may be moved to position selected portions of one of the films between a light opening in the casing and an eyepiece carried by a cover plate secured to the casing. The eyepiece may then be focused and will produce a magnified image of the reproduction on the film for viewing purposes.

The lens system of the eyepiece of the device has a field of view sufficient to permit the observation of the entire reproduction of the film of lesser width but only half the reproduction of the film of the greater width. This is desirable to insure the compactness of the device for the easy handling and ready carrying of the device.

If desired, the magnification of the reproduction on the film may be increased for the minute examination of the same by an auxiliary lens system mounted in the cover plate for movement into the optical axis of the eyepiece.

In a modified form of the invention, the eyepiece and auxiliary lens system are movable as a unit relative to the illuminated film held in the movable film holder. This permits the device to be made more compact in size for the film holder need only be formed of sufficient length to permit the two films of different widths to be inserted therein as one of the films held in the film holder need only be positioned relative to the light opening and movement of the film holder thereafter to position the film in the view of the eyepiece need not be had. The eyepiece can then be moved to a position wherein the entire reproduction on the film of lesser width may be viewed or can be successively moved to view each half of the reproduction on the film of greater width, dependent upon the film selected for observation. This permits the length of the film holder to be decreased which effects a decrease in the length of the device.

In another modification of the invention, the device is formed to permit a relatively large area of the film to be held in the film holder for the viewing of the same and the eyepiece and auxiliary lens are mounted for movement the length and width of the film. By so doing, the eyepiece may be positioned to permit any part of the illuminated film to be viewed successively or, if desired, indiscriminately. It will be apparent that in this embodiment of the invention, the device is advantageous for rapidly viewing either of the films for the frequency of positioning and aligning a new section of the film in the film holder, as had in the other forms of the device, is dispensed with.

The film viewing device of the present invention, and its modifications, is simple in construction, easy and economical to manufacture, may be readily assembled and is easily adjusted in use.

Further objects and advantages of the present invention will appear in the following specification and in the accompanying drawings in which:

Fig. 1 is a side elevation, partly in section, of the film viewing device in its preferred form.

Fig. 2 is a top plan view of the same.

Fig. 3 is a top plan view of the film holder for holding two different widths of films.

Fig. 4 is a section taken on line 4—4 of Fig. 1.

Fig. 5 is a top plan view of a modification of the present invention.

Fig. 6 is a side elevation, partly in section, of the same.

Figure 7:
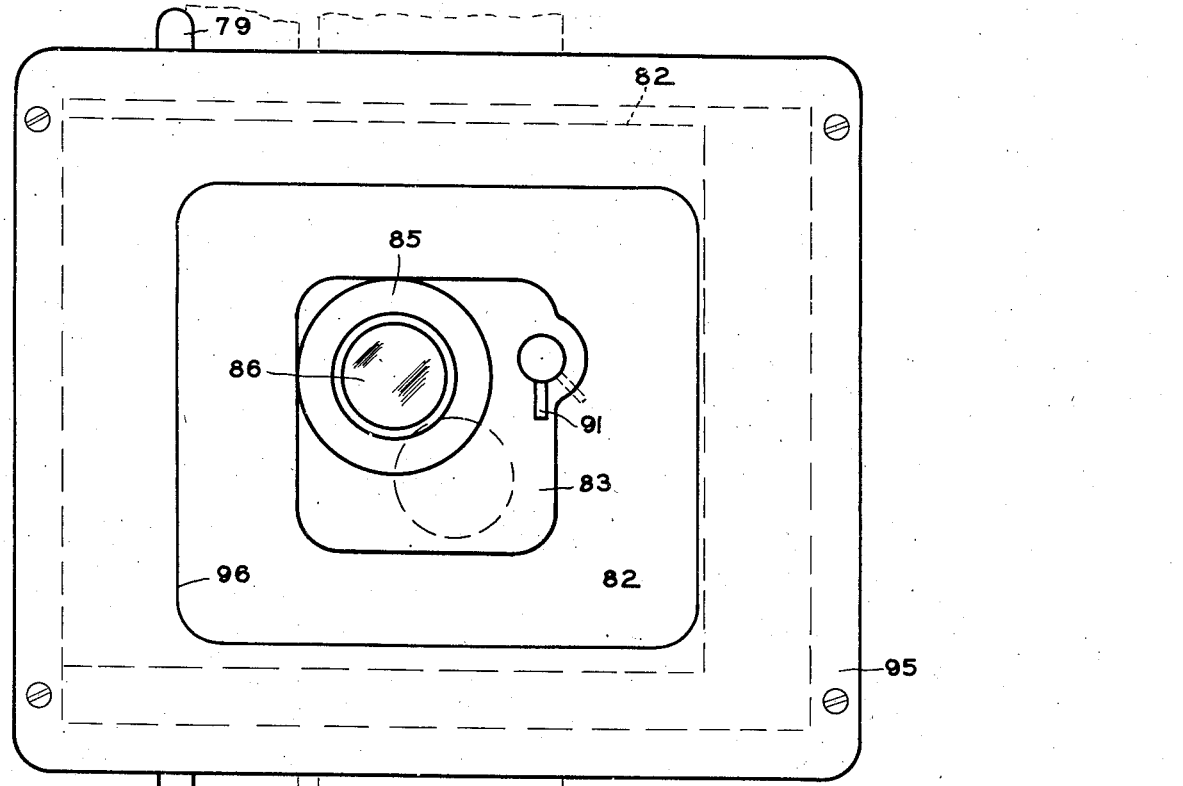
Fig. 7 is a top plan view of another modification of the present invention.

The preferred embodiment of the invention is illustrated in Figs. 1 to 3 wherein the device comprises a casing 10 having an opening 11 formed in the bottom wall thereof. The opening is closed by a transparent plate 12 slidably mounted in a channel 13 formed in the bottom wall and of a size sufficient to close said opening in all positions thereof. The plate 12 actually forms a portion of the bottom wall of the casing and, in the preferred embodiment of the invention, is used to carry the film to be viewed.

The casing includes a cover plate 14 which is formed with an integral barrel 15 for receiving a plurality of lenses forming an eyepiece for viewing the film. The casing 10 and cover plate 14 are preferably molded of a plastic material to permit the ready formation of the same.

To permit the films 16 and 17 to be inserted into the film holder, the upper surface of the plate 12 is formed with a pair of channels 18 and 19 of different widths and each having a shoulder formed in the opposite walls thereof as at 21 and 22, respectively, for receiving the edges of the films 16 and 17.

To prevent the films from buckling and to hold the films flat, a plate 23 having apertures 23' and 24' is cemented to the top face of the transparent plate 12 and engages the edges of the films received in the shoulders 21 and 22. As the films are engaged only at their edges, there is little likelihood that the portion of the films carrying the image becoming scratched by contact with the viewing device.

The eyepiece carried by barrel 15 comprises the lenses 25 and 26 which are mounted in tube 27 slidably held in tube 28 which in turn is slidable in barrel 15 whereby the eyepiece may be focused.

In operation, the film holder may be moved by lugs 28, formed integral with the plate 23 and extending laterally therefrom, to position a selected portion of one of the films between the opening 11 in the casing 10 and the eyepiece carried by the cover plate 14. The film will be illuminated by the passage of light through the opening 11 and the film holder so that a magnified image of the reproduction on the film may be viewed upon focusing the eyepiece.

In many cases, it is desirable to secure a greater magnification of a selected portion of the reproduction on the film than afforded by the lenses 25 and 26 of the eyepiece. For this purpose, the magnification of the film image may be augmented by movement of an auxiliary lens 29 into the optical axis of the eyepiece. To effect this desired result, the lens 29 is mounted in a slide member 30 carried in a raised portion 31 of the cover plate 14. The raised portion 31 is formed integral with the barrel 15 and has a groove extending therethrough receiving the slide member 30. Referring now to Fig. 4, the slide member 30 is held within the groove by retaining plates 32 and 33 secured to the surfaces of the edges defining the groove by screws, as shown. To accurately position the axis of the lens 29 with the optical axis of the eyepiece, the slide member 30 is provided with a stop pin 34 to limit the inward movement of the lens 29 beyond a predetermined position. It will be apparent that the lens 29 may be withdrawn to an inactive position beneath the portion 31 of the cover plate upon movement of the slide member 30 in an outward direction. To facilitate the movement of the member 30, the outer end thereof is provided with a groove 35 for engagement with a finger of the user. To prevent the tube 28 contacting the slide member, a stop pin 36 is mounted in the barrel 15 to limit downward movement of the tube.

The field of view of the eyepiece lens system is such as to include the entire width of the film 16 but only half the width of the film 17. With this construction, the device is maintained at a minimum size so as to afford greater convenience and facilitate its use.

In the modifications shown in Figs. 5 and 6, the film viewing device there shown differs from that of Figs. 1 to 4 in that the eyepiece and auxiliary lens contained in the lens barrel and raised portion integral therewith are mounted for movement as a unit in the cover plate 40. For this purpose, the cover plate 40 is formed to provide a channel 41 in which is movably mounted a slide member 42 integral with the lens barrel 43 holding the eyepiece and the raised portion 44 housing the auxiliary lens 45. The slide member 42 is confined within the channel 41 by a pair of retaining plates 46 and 47 engaging the upper edge surfaces of the slide member. The plates 46 and 47 are secured to the cover plate by screws, as shown.

The eyepiece comprises the lenses 48 and 49 which are carried by a tube 50 threaded into tube 51 which in turn is threaded into lens barrel 43. It will be apparent that the lenses may be focused by turning the knurled portions of the tubes 50 and 51. The auxiliary lens 45 is mounted on slide 52 so that it may be selectively positioned in or out of cooperative relation with the eyepiece lenses in order to vary the magnification.

The casing 53, carrying the cover plate 40, is provided with a channel 54 in which is slidably mounted a glass plate 55 having on its face cutaway portions 56 and 57. An opaque plate 58 having spaced apertures 59 and 60 is cemented to the top of plate 55 with the apertures substantially in alignment with the cut-away portions 56 and 57. The under surface of plate 58 has shoulders 61 and 62 formed, respectively, along the sides of the apertures 59 and 60 so as to provide slideways for receiving the two films, 63 and 64.

In operation, the films 63 and 64 are inserted in the slideways formed between plates 55 and 58. The film holder may be moved by means of the lugs 65, integral with plate 58, to selectively position the desired film in alignment with the eyepiece and the opening 66 formed in the casing 53. When the wider film 64 is opposite opening 66, the respective halves of the area in alignment may be selectively viewed by moving slide 42 by grasping the barrel 43 so as to locate the eyepiece in the desired position.

Figure 8:
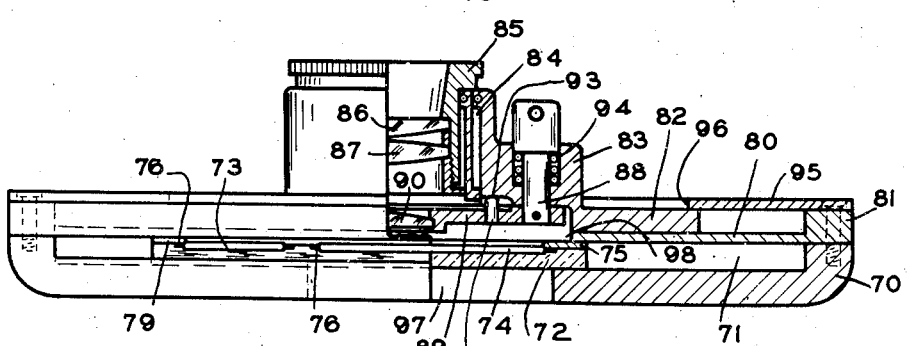
Fig. 8 is a side elevation, partly in section, of the same.

In the modification shown in Figs. 7 and 8, the device comprises a casing 70 having a channel 71 in which is slidably mounted a film holder. The film holder is formed of a glass plate 72 having on its upper face the cut-away portions 73 and 74. As in the other film holders, an apertured opaque plate 75 is cemented to the top of plate 72 with the apertures substantially in alignment with the cut-away portions. Adjacent the edges of the cut-away portions in the glass plate 72 there are formed shoulders 76 so as to provide slideways for the films 77 and 78. The film holder may be moved by means of the lugs 79 formed integral with plate 75 and extending laterally from the casing.

A plate 80 secured to the top of casing 70 has an upturned flange 81 extending around all sides thereof. Slidably mounted on the top of plate 80 is a slide member 82 having an integral upstanding portion 83 provided with a bore 84 for slidably receiving the tube 85 carrying lenses 86 and 87. Rotatably mounted in portion 83 is a stub shaft 88 carrying an arm 89 which holds the auxiliary lens 90. By means of an arm 91 the lens 90 may be selectively swung into or out of operative relation with the lenses 86 and 87. The lens 90 is held in selected position by means of the pin 92, carried by arm 89, which is urged into notch 93 by spring 94 surrounding shaft 88.

Mounted on the upturned flange 81 is the cover plate 95 which has the centrally disposed aperture 96 through which the portion 83 extends. The aperture 96 is relatively large in area but is smaller than the area of slide 82 which, in turn, is smaller than the area confined by the flange 81. It will thus be apparent that the slide member 82, carrying the eyepiece, may be moved freely in different directions so as to position the eyepiece in different locations over the film which is in alignment with aperture 97 in the bottom of casing 70 and the aperture 98 in plate 80.

In this embodiment of the invention, the formation of the device permits a relatively large area of each film to be held in the film holder for the viewing of the same. As the eyepiece is movable the length and width of the film, the eyepiece may be positioned to permit any part of the illuminated film to be viewed successively, or, if desired, indiscriminately.

It will be apparent from the foregoing that I have attained the objects of my invention and provided a compact film viewing device for viewing selected portions of one of a plurality of films of different widths at varying magnifications. Various modifications other than those shown and described may obviously be made without departing from the spirit of my invention or the scope of the appended claims.

I claim:

1. A film viewing device comprising a casing, having a wall formed with an opening providing a light passage; a film holder slidably mounted in said casing adjacent the opening in said wall; said film holder having guideways of different widths for receiving films of different widths; a cover plate for said casing; a slide member mounted in said cover plate for movement in a plane parallel to the plane of the illuminated film; a lens barrel fixed to said slide member; a lens system carried in said lens barrel for viewing the illuminated film; a slide member movably mounted in said first-named slide member; an auxiliary lens system mounted in said second-named slide member; means for moving said holder to position one of said films between the opening in said wall and said first-named lens system; means for moving said first-named slide member to position any selected portion of the illuminated film in the field of view of the first-named lens system; and means for moving said second-named slide member to position said auxiliary lens system with the axis thereof in alignment with the axis of said first-named lens system.

2. A film viewing device comprising a casing, said casing having a wall having a slideway and a transparent portion forming a light passage; a film holder slidably mounted in said slideway adjacent said transparent portion, said film holder having guideways of different widths for receiving films of different widths; a retaining plate fixed to said casing for holding said film holder in said slideway, said retaining plate formed substantially rectangular in form and having an opening therein forming a light passage; means for moving said film holder to position one of said films in the path of light from said transparent portion; a slide member movably mounted in said plate, said member formed substantially rectangular in shape and of less area than said plate to permit movement of said member in any direction on said plate; a lens barrel fixed to said slide member; a lens system carried in said lens barrel for viewing the illuminated film; and a cover plate secured to said retaining plate and having an opening through which said lens barrel extends, the opening in said cover plate permitting movement of the slide member on said retaining plate the length and width of the illuminated film to bring any selected portion of the film in the field of view of said lens system.

3. A film viewing device comprising a casing, said casing having a wall having a slideway and an opening forming a light passage; a film holder slidably mounted in said slideway adjacent said opening, said film holder having guideways of different widths for receiving films of different widths; a retaining plate fixed to said casing for holding said film holder in said slideway, said retaining plate formed substantially rectangular in form and having an opening therein forming a light passage; means for moving said film holder to position one of said films in the path of light from said opening; a slide member movably mounted in said plate, said member formed substantially rectangular in shape and of less area than said plate to permit movement of said member in any direction on said plate; a lens barrel fixed to said slide member; a lens system carried in said lens barrel for viewing the illuminated film; a cover plate secured to said retaining plate and having an opening through which said lens barrel extends, the opening in said cover plate permitting movement of the slide member on said retaining plate the length and width of the illuminated film to bring any selected portion of the film in the field of view of said lens system; a slide member movably mounted in said first-named slide member; an auxiliary lens system carried by said second-named slide member; and means for moving said slide member to position said auxiliary lens system with the axis thereof in alignment with the axis of said first-named lens system.

4. A film viewing device comprising a casing, lens means carried by the casing, a wall of the casing having an aperture in alignment with the lens means, a film carrying member within the casing, said member comprising a light transmitting plate having integrally formed channel means for slidably supporting films of different widths, said member being slidably mounted within the casing to selectively position the different films in alignment with the lens means, and means externally of the casing for moving the film carrying member.

5. A film viewing device comprising a casing having an aperture in a wall, lens means carried by the casing in alignment with the aperture, a film carrying member mounted within the casing, said member comprising a transparent plate having channels for receiving films of different widths and an opaque plate having apertures secured to the transparent plate above the channels to provide film guideways, said member being slidably mounted within the casing to selectively position the different films in alignment with the lens means.

6. A film viewing device comprising a casing having a wall provided with an aperture, lens means carried by said casing in alignment with the aperture, a film carrying member movably mounted within the casing, said member comprising a transparent plate having channels formed on a surface thereof, an apertured metal plate secured to the channeled surface of the transparent plate whereby the channels provide film guideways, and portions on the metal plate extending through slots in the casing whereby the member may be moved to selectively position a film in operative relation to the lens means.

7. A film viewing device comprising a casing, top, bottom, and intermediate walls on the casing, said walls having apertures which are in alignment, a slide mounted to move between the top and intermediate walls in transverse and longitudinal directions, mounting means carried by the slide in alignment with an aperture in the slide, lens means carried by the mounting means, said mounting means projecting through the aperture in the top wall, means for holding a film between the intermediate and bottom walls and in alignment with the apertures therein, the area of the aperture in the top wall being larger in longitudinal and transverse directions than that of the mounting means whereby the slide may be moved longitudinally and transversely to selectively position the lens means relative to the film.

8. A film viewing device comprising a casing, top, bottom, and intermediate walls on the casing, said walls having apertures which are in alignment, a slide mounted to move in transverse and longitudinal directions between the top and intermediate walls, mounting means carried by the slide in alignment with an aperture in the slide, lens means carried by the mounting means, said mounting means projecting through the aperture in the top wall, means for holding a film between the intermediate and bottom walls and in alignment with the apertures therein, the area of the aperture in the upper wall being larger in longitudinal and transverse directions than that of the mounting means whereby the slide may be moved longitudinally and transversely to selectively position the lens means relative to the film, and supplementary lens means carried by a holder on the mounting means, said holder being swingably mounted, and means for retaining the holder in adjusted position whereby the supplementary lens means may be selectively moved into or out of cooperative relationship with the lens means.

CLARENCE J. ECKERT.